United States Patent
Sundy et al.

(10) Patent No.: US 10,086,770 B2
(45) Date of Patent: Oct. 2, 2018

(54) VEHICLE MOUNTING SYSTEM

(71) Applicant: Havis, Inc., Warminster, PA (US)

(72) Inventors: Mark P. Sundy, Abington, PA (US);
Joseph Bernert, Hatboro, PA (US);
Stephen Telesco, Dexter, MI (US);
Bruce Jonik, Canton, MI (US)

(73) Assignee: Havis, Inc., Warminster, PA (US)

( * ) Notice: Subject to any disclaimer, the term of this patent is extended or adjusted under 35 U.S.C. 154(b) by 0 days.

(21) Appl. No.: 15/441,587

(22) Filed: Feb. 24, 2017

(65) Prior Publication Data

US 2018/0244210 A1 Aug. 30, 2018

(51) Int. Cl.
F16M 11/00 (2006.01)
B60R 11/00 (2006.01)
F16M 13/02 (2006.01)
B60R 11/02 (2006.01)

(52) U.S. Cl.
CPC ............ B60R 11/00 (2013.01); F16M 13/02 (2013.01); *B60R 11/0241* (2013.01); *B60R 2011/0005* (2013.01)

(58) Field of Classification Search
CPC ....... F16M 13/022; F16M 13/02; B60R 11/00
See application file for complete search history.

(56) References Cited

U.S. PATENT DOCUMENTS

| | | |
|---|---|---|
| 5,109,411 A | 4/1992 | O'Connell |
| 5,240,215 A | 8/1993 | Moore |
| 5,279,488 A * | 1/1994 | Fleming .................. B60N 3/00 108/43 |
| 6,244,553 B1 | 6/2001 | Wang |
| 2013/0327912 A1* | 12/2013 | Yoshida ............... F16M 13/022 248/289.11 |

FOREIGN PATENT DOCUMENTS

| | | |
|---|---|---|
| DE | 29616930 U1 | 11/1996 |
| DE | 202008006568 U1 | 8/2008 |
| EP | 1892154 A1 | 2/2008 |

OTHER PUBLICATIONS

Ford Police Interceptor Utility On-Dash Mount, Item #7160-0878, Camber-Johnson, LLC, http://www.gamberjohnson.com/products/ford-police-interceptor-utility-dash-mount, 2017, 2 pages.
HiNT Mounts, On-Dash Mount, Part #TM-5124-PIS/PIU, http://hintperipherals.com/catalog/on_dash/TM-5124.php, 2017, 1 page.
Extended European Search Report for European Application No. 17178175.0, dated Dec. 14, 2017, 7 pages.

* cited by examiner

*Primary Examiner* — Amy J. Sterling
(74) *Attorney, Agent, or Firm* — RatnerPrestia

(57) ABSTRACT

Systems for mounting an object within a vehicle are disclosed. One such system includes a mounting plate, a bracket, and a hinge. The mounting plate is configured to be affixed to a dashboard of the vehicle. The bracket is adapted to receive the object to be mounted. The hinge has a base portion and a body portion movable relative to the base portion. The base portion of the hinge is mounted to the mounting plate and the body portion of the hinge is mounted to the bracket. The body portion of the hinge is pivotable relative to the base portion around a first axis, and the body portion of the hinge is rotatable around a second axis different from the first axis.

11 Claims, 6 Drawing Sheets

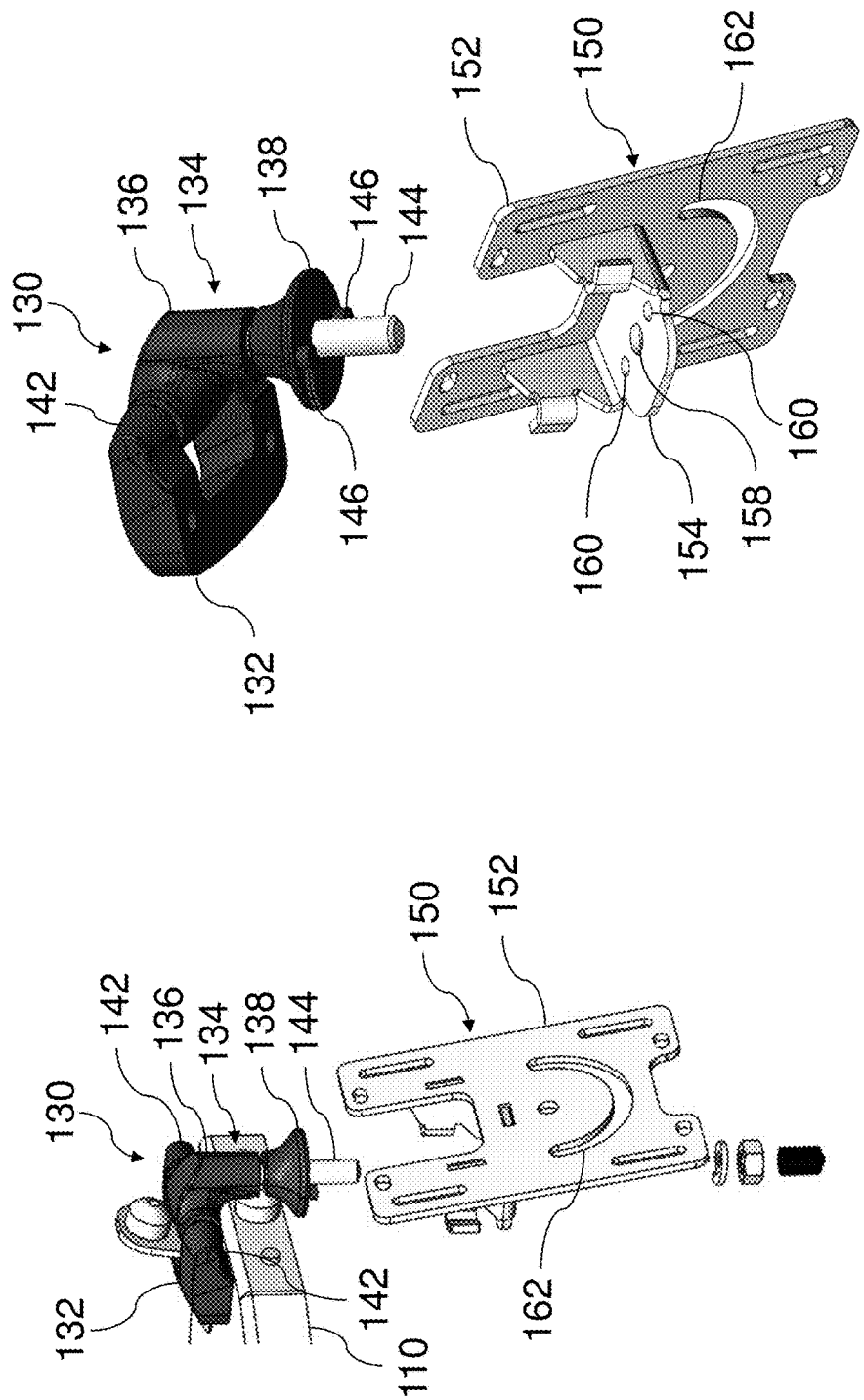

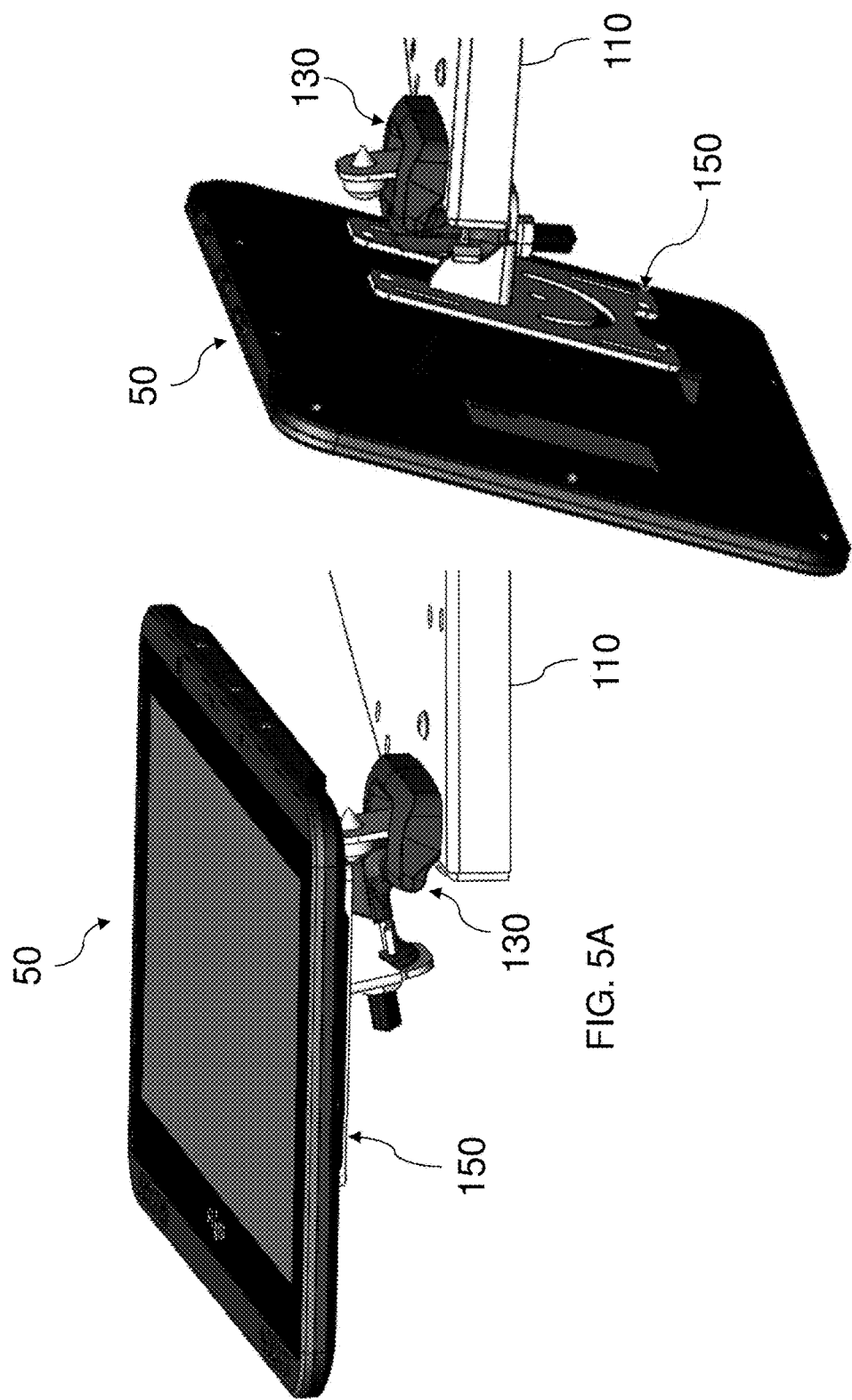

VEHICLE MOUNTING SYSTEM

FIELD OF THE INVENTION

The present invention relates generally to mounting systems, and more particularly, to systems for repositionably mounting objects within a vehicle.

BACKGROUND OF THE INVENTION

Specialized vehicles are an essential tool in many different professions. In particular, professions such as law enforcement commonly utilize a number of specialized electronic systems (e.g., computers, radio systems, sirens) that are not found in conventional automobiles. While vehicles may be specially manufactured that include these systems, these systems may also be added to conventional automobiles through after-market installations. However, one problem that arises from such installations is the simple and effective mounting of after-market electronic devices in conventional vehicles. Improved systems are desired for repositionably mounting objects in vehicles.

SUMMARY OF THE INVENTION

Aspects of the present invention are directed to systems for mounting an object within a vehicle.

In accordance with one aspect of the present invention, a system for mounting an object within a vehicle is disclosed. The system includes a mounting plate, a bracket, and a hinge. The mounting plate is configured to be affixed to a dashboard of the vehicle. The bracket is adapted to receive the object to be mounted. The hinge has a base portion and a body portion movable relative to the base portion. The base portion of the hinge is mounted to the mounting plate and the body portion of the hinge is mounted to the bracket. The body portion of the hinge is pivotable relative to the base portion around a first axis, and the body portion of the hinge is rotatable around a second axis different from the first axis.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIGS. 4A and 4B are views of an exemplary bracket of the system of FIG. 1;

FIGS. 5A and 5B are views of the system of FIG. 1 with a mounted object; and

DETAILED DESCRIPTION OF THE INVENTION

The systems disclosed herein are usable to provide mounting for objects within conventional vehicles (such as automobiles). While the disclosed systems are described herein with respect to mounting within the cabin of a vehicle, it will be understood that the invention is not so limited. To the contrary, aspects of the present invention are usable in any application in which a repositionable mount is desired.

While a variety of objects may be mounted within the disclosed systems, the disclosed mounting systems are particularly suitable for mounting electronic devices, such as laptops, tablets, or mobile phones. Such devices may be subject to periodic use within the vehicle, and as such, the disclosed systems advantageously allow such objects be repositioned between a "use" and "stow" position while remaining mounted to a portion of the vehicle. Other electronic devices or objects mountable with the disclosed systems will be known to those of ordinary skill in the art from the description herein.

With reference to the drawings, FIGS. 1-4B illustrate an exemplary system 100 for mounting an object within a vehicle in accordance with aspects of the present invention. System 100 is usable to repositionably mount objects, such that they can be moved within various stable positions within a vehicle. In general, system 100 includes a mounting plate 110, a hinge 130, and a bracket 150. Additional details of system 100 are provided herein.

Figure 1:
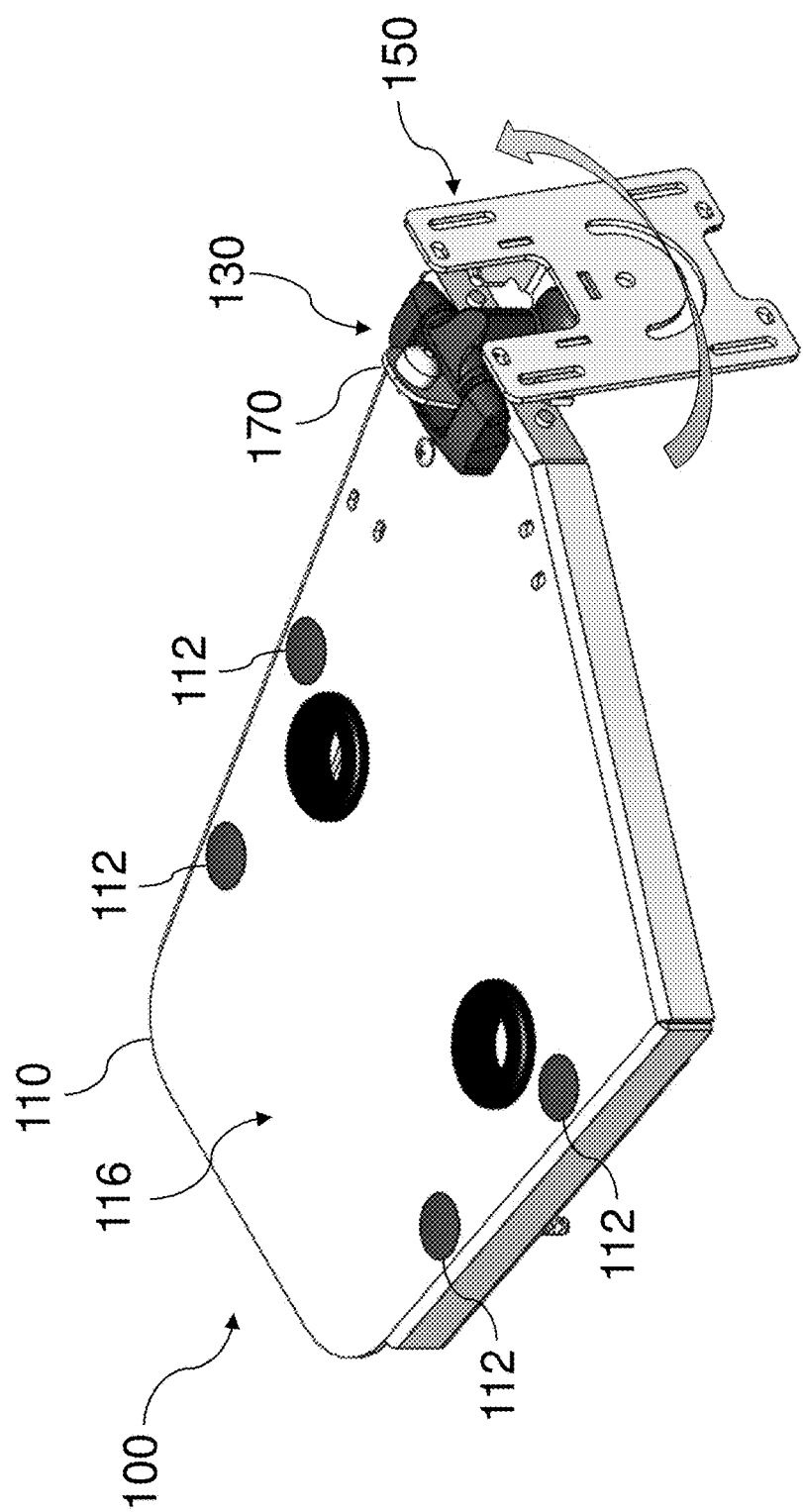
FIG. 1 is a perspective view of an exemplary system for mounting an object within a vehicle in accordance with aspects of the present invention.

Mounting plate 110 is configured to be affixed to the dashboard of the vehicle. As shown in FIG. 1, mounting plate 110 may include one or more fasteners 112 to affix mounting plate 110 to the dashboard. Suitable fasteners include, for example, screws, bolts, pins, or other fasteners. Fasteners 112 may be configured to mate with pre-existing structures on the dashboard, or may require the creation of new structures (such as threaded holes, anchors, etc.) to enable the affixation.

Figure 6:
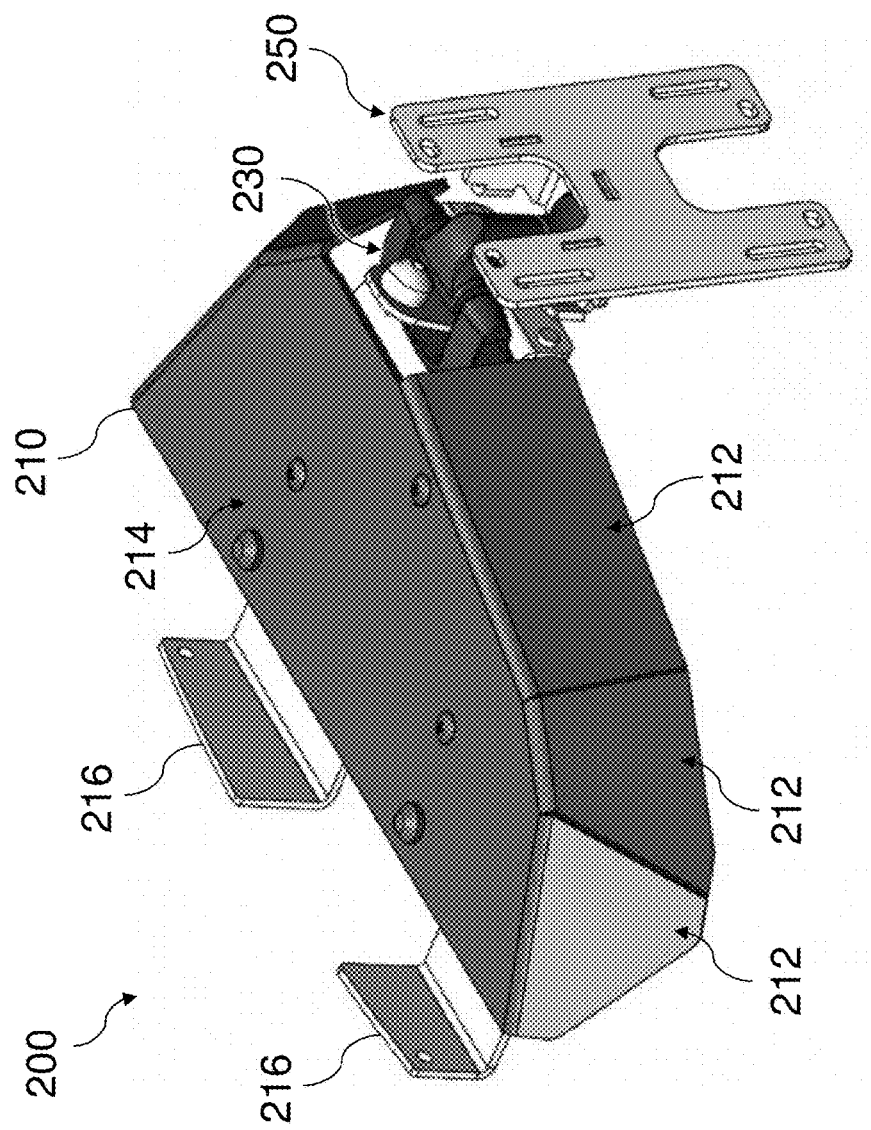
FIGS. 6 and 7 are views of exemplary systems for mounting an object within a vehicle including alternative mounting plates in accordance with aspects of the present invention.
Figure 7:
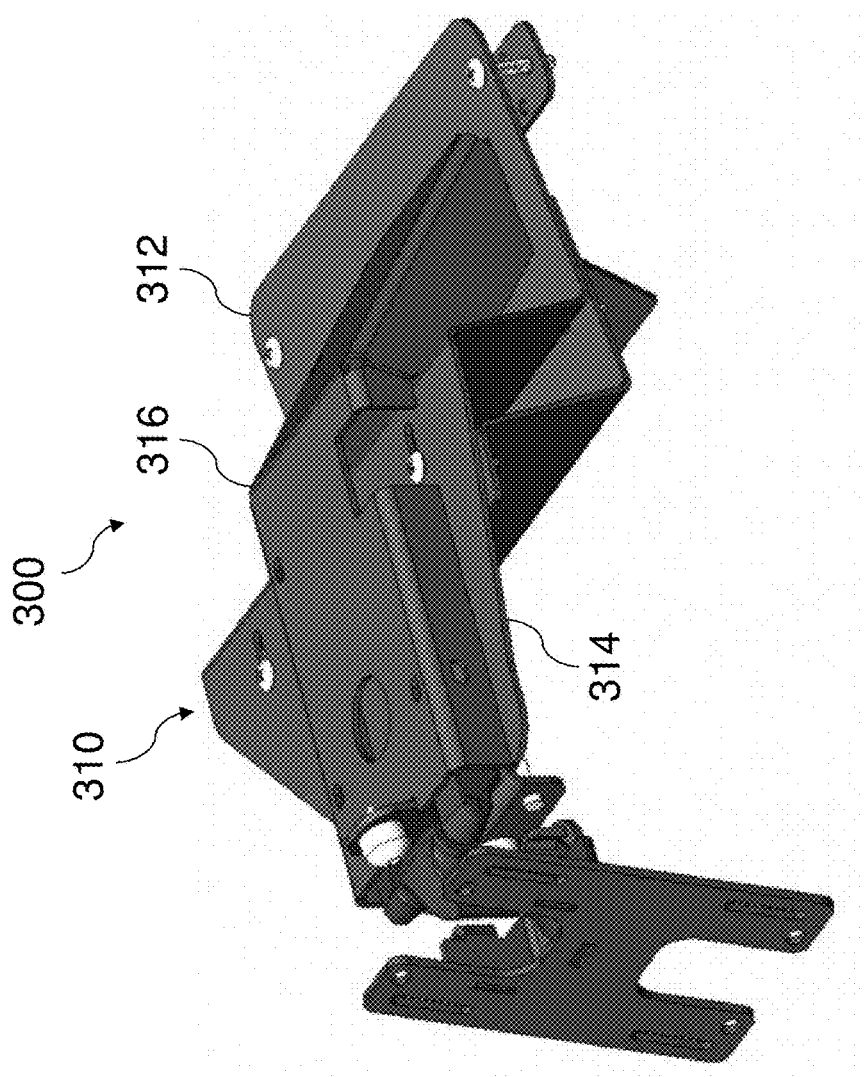

In an exemplary embodiment, mounting plate 110 comprises a single, flat plate. However, it will be understood that the structure of mounting plate 110 shown in FIG. 1 is not intended to be limiting. To the contrary, mounting plate 110 may have other geometries depending on the shape of the dashboard to which system 100 is mounted. Other exemplary mounting plate shapes are shown in FIGS. 6 and 7, and are discussed in greater detail below.

Figure 2:
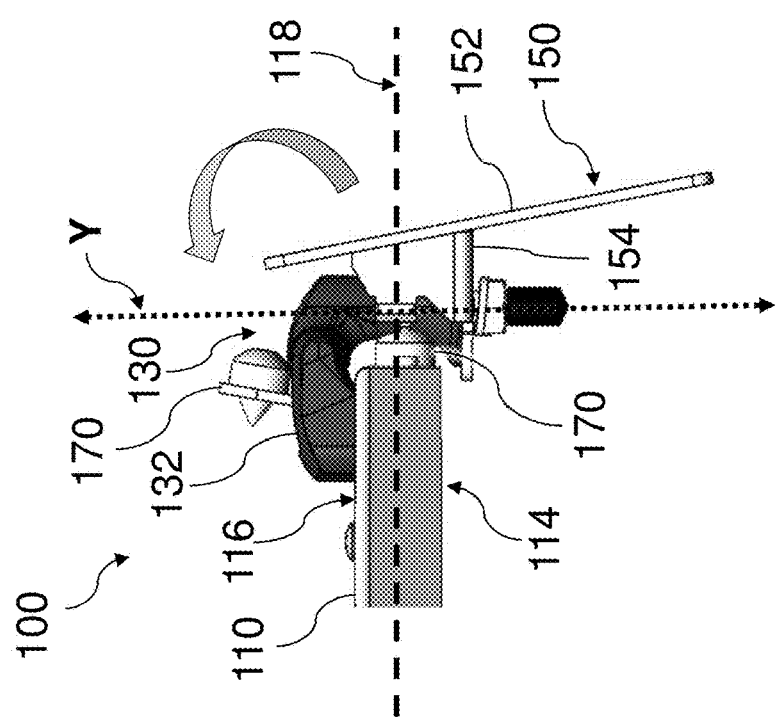
FIG. 2 is a side view of the system of FIG. 1.

As shown in FIG. 2, mounting plate 110 has a first surface 114 which is configured to face the dashboard and a second surface 116 opposite the first surface 114. Mounting plate 110 defines a plane 118 (shown with a dashed line in FIG. 2) between surfaces 114 and 116 at a portion of mounting plate 110 to which hinge 130 is coupled. The movement of hinge 130 relative to plane 118 will be described in greater detail below.

Hinge 130 has a base portion 132 and a body portion 134 which is movable relative to base portion 132. As shown in FIGS. 1 and 2, base portion 132 is mounted to the second surface 116 of mounting plate 110. In an exemplary embodiment, base portion 132 is mounted at an edge of second surface 116 to enable a desired range of motion of body portion 134.

Body portion 134 is pivotable relative to base portion 132 around a first axis X, and is rotatable around a second axis Y. First axis X extends in a direction parallel to plane 118. Second axis Y extends orthogonally to, but spaced from, first axis X. Accordingly, pivoting body portion 134 around first axis X moves body portion in a first rotational direction (shown by arrow in FIG. 2), and rotating body portion 34 around second axis Y moves body portion in a second, orthogonal rotational direction (shown by arrow in FIG. 1). As shown in FIG. 2, first axis X and second axis Y do not intersect.

In an exemplary embodiment, body portion 134 includes an upper section 136 and a lower section 138. The first axis X around which body portion 134 pivots is defined by a pin 140. Pin 140 extends through a pair of arms 142 on base portion 132, and through an aperture in the upper section 136 of body portion 134. The position of body portion 134 relative to base portion 132 may be maintained due to friction between pin 140, arms 142, and upper section 136. Additionally, lower section 138 is rotatable around the second axis Y relative to upper section 136.

Lower section 138 of body portion 134 may include one or more features designed to mate with and secure to bracket 150. In an exemplary embodiment, lower section 138 includes a threaded rod 144 for threaded engagement with a corresponding threaded hole on bracket 150. Additionally, lower section 138 may include one or more keying features 146 to ensure rotation of bracket 150 when lower section 138 is rotated relative to upper section 136.

Bracket 150 is mounted to body portion 134 of hinge 130. Bracket 150 may be mounted to the lower section 138 of body portion 134, so as to be rotatable around second axis Y relative to the upper section 136 of body portion 134.

Figure 3:
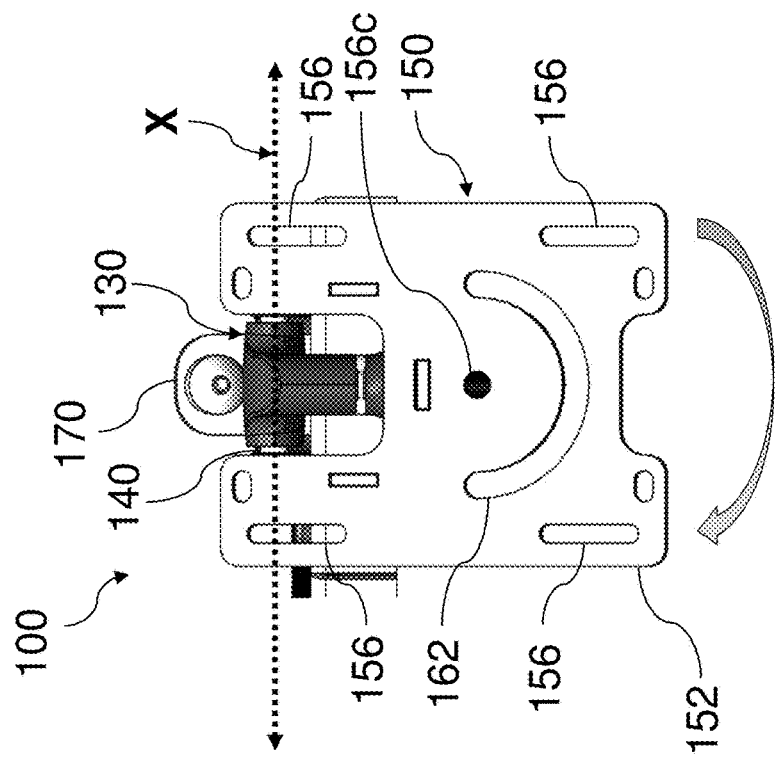
FIG. 3 is a front view of the system of FIG. 1.

In an exemplary embodiment, bracket 150 includes a plate 152 and a frame 154 coupled to a rear surface of the plate 152, as shown in FIG. 4B. Plate 152 is adapted to receive and secure the object to be mounted. As shown in FIG. 3, plate 152 may include one or more openings 156 on a front surface thereof in order to receive fasteners for securing the object to be mounted to plate 152. Frame 154 is adapted to be mounted to body portion 134 of hinge 130. As shown in FIG. 4B, frame 154 may include a threaded opening 158 for threadingly engaging with threaded rod 144 of hinge 130. Frame 154 may also include one or more keying features 160 positioned to mate with keying features 146 on hinge 130.

As shown in FIG. 3, bracket 150 may further comprise a slot 162 which defines an additional movement direction of the mounted object relative to bracket 150. In this embodiment, the object to be mounted is affixed to a center opening 156c of bracket 150, and includes a projection which extends into slot 162. Slot 162 defines a rotational movement path which extends around center opening 156c at a fixed radial distance. This rotational movement path allows rotation of the mounted object due to movement of the projection through slot 162. This rotation proceeds around an axis through center opening 156c and orthogonal to bracket 150, and is shown by arrow in FIG. 3. Such rotation of the mounted object is orthogonal to both the pivoting movement around first axis X and to the rotational movement around second axis Y. Accordingly, the object mounted to bracket 150 is movement in three degrees of freedom relative to the mounting plate 110 and/or the dashboard of the vehicle.

In operation, the object to be mounted is affixed to plate 152 of bracket 150. Body portion 134 of hinge 130 is pivotable around first axis X between a first position (shown in FIG. 5A) and a second position (shown in FIG. 5B). System 100 may further include one or two bumpers 170 to delimit the pivoting movement of body portion 134. As shown in FIG. 2A, an upper bumper 170 delimits movement of body portion 134 to the first position, and a lower bumper 170 delimits movement of body portion 134 to the second position.

FIGS. 5A and 5B show system 100 with an exemplary object 50 mounted thereto. As shown in FIG. 5A, in the first position, bracket 150 is positioned entirely on one side (i.e., above) plane 118 defined by mounting plate 110. As shown in FIG. 5B, in the second position, bracket 150 is positioned crossing plane 118, with portions both above and below plane 118. In this position, the second axis Y passing through body portion 134 is orthogonal to plane 118, allowing left-right movement of the mounted object.

FIGS. 6 and 7 show alternative exemplary systems 200 and 300, respectively, for mounting an object within a vehicle. These systems illustrate potential changes in the design of mounting plates vehicle in accordance with aspects of the present invention.

System 200 includes a mounting plate 210. As shown in FIG. 6, mounting plate 210 includes a plurality of front surfaces 212 facing toward bracket 250. Front surfaces 212 extend downward at an angle from the upper surface 214 of mounting plate 210. Front surfaces 212 may provide for an easier and/or more stable connection of mounting plate 210 to the dashboard of the vehicle.

Mounting plate 210 may be mounted directly to a vehicle, or may be mounted to a vehicle via an intermediate mounting plate 216. In this embodiment, intermediate mounting plate 216 supports the mounting of the hinge 230. Together, mounting plate 210 and intermediate mounting plate 216 are configured to be secured to the vehicle dashboard by way of a clamping effect. In this configuration, mounting plate 210 may also be configured to act as a close-out for an opening in the dashboard created by removal of a factory/OEM component to facilitate the mounting of system 200. Screws (shown on the top surface of mounting plate 210) may be used to secure mounting plate 210 and intermediate mounting plate 216 together. Bumpers may be provided on an underside of mounting plate 210 in contact with the dashboard to ensure sufficient clamping to the dashboard without marring the finish of the dashboard.

System 300 includes a mounting plate 310. As shown in FIG. 7, mounting plate 310 includes a first level plate 312 and a second level plate 314 which is affixed to and spaced upwardly from the first level plate 312. The spacing of first level plate 312 and second level plate 314 may be useful to accommodate dashboards having different structures, and may be used to provide a more stable connection of mounting plate 310 to the dashboard of the vehicle. Mounting plate 310 further includes a ridge extending from the first level plate 312 to the second level plate 314. Ridge 316 may be useful to increase the mechanical strength of mounting plate 310.

Like system 200, system 300 may utilize a main mounting plate and an intermediate mounting plate to provide the requisite stability/structural integrity of the mounting system. In this case, the mounting plate 300 supports the mounting of the hinge, rather than the intermediate plate, as described above with respect to system 200.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for mounting an object within a vehicle comprising:
    a mounting plate configured to be affixed to a dashboard of the vehicle;
    a bracket adapted to receive the object to be mounted; and
    a hinge having a base portion and a body portion movable relative to the base portion, the base portion of the hinge mounted to the mounting plate and the body portion of the hinge mounted to the bracket, the body portion of the hinge being pivotable relative to the base portion around a first axis, and the body portion of the hinge being rotatable around a second axis different from the first axis,
    wherein the bracket comprises a plate and a frame coupled to the plate, the plate adapted to receive the object to be mounted, the frame adapted to be mounted to the body portion of the hinge,
    wherein the plate of the bracket comprises a slot defining a movement direction of the object relative to the bracket, and
    wherein the movement direction defined by the slot is a rotational movement direction.

2. The system of claim 1, wherein the mounting plate has a first surface configured to face the dashboard of the vehicle and a second surface opposite the first surface; and
    the base portion of the hinge is mounted to the second surface of the mounting plate.

3. The system of claim 2, wherein the base portion of the hinge is mounted at an edge of the second surface of the mounting plate.

4. The system of claim 1, wherein the mounting plate defines a plane, and
    wherein the first axis is parallel to the plane.

5. The system of claim 4, wherein the body portion of the hinge is pivotable around the first axis between a first position in which the bracket is positioned entirely on one side of the plane, and a second position in which the bracket is positioned crossing the plane.

6. The system of claim 5, wherein when the body portion of the hinge is in the second position, the second axis is orthogonal to the plane.

7. The system of claim 1, wherein the first axis and the second axis do not intersect.

8. The system of claim 1, wherein the body portion of the hinge pivots around the first axis in a first rotational direction, and rotates around the second axis in a second rotational direction, and the first and second rotational directions are orthogonal to one another.

9. The system of claim 1, further comprising at least one bumper affixed to the mounting plate, the at least one bumper delimiting a pivoting movement of the body portion of the hinge in one direction around the first axis.

10. A system for mounting an object within a vehicle comprising:
    a mounting plate configured to be affixed to a dashboard of the vehicle;
    a bracket adapted to receive the object to be mounted;
    a hinge having a base portion and a body portion movable relative to the base portion, the base portion of the hinge mounted to the mounting plate and the body portion of the hinge mounted to the bracket, the body portion of the hinge being pivotable relative to the base portion around a first axis, and the body portion of the hinge being rotatable around a second axis different from the first axis; and
    a pair of bumpers affixed to the mounting plate, the pair of bumpers delimiting a pivoting movement of the body portion of the hinge in both directions around the first axis.

11. The system of claim 1, wherein the rotational movement direction defined by the slot is orthogonal to a rotational direction of movement of the body portion of the hinge around the second axis.

* * * * *